Patented Mar. 9, 1954

2,671,815

UNITED STATES PATENT OFFICE 2,671,815

MANUFACTURE OF DIARYLALKANES

Herman Pines and Vladimir N. Ipatieff, Chicago, Ill., assignors to Universal Oil Products Company, Chicago, Ill., a corporation of Delaware No Drawing. Application June 21, 1950,
Serial No. 169,525

16 Claims. (Cl. 260—668)

1

This application is a continuation-in-part of our co-pending application Serial Number 788,645 (now Patent No. 2,526,896, October 24, 1950) which was filed November 28, 1947, as a continuation-in-part of application Serial Number 619,430 filed September 29, 1945, now abandoned.

This invention relates to a process for manufacturing diarylalkanes and particularly for manufacturing alkylated diphenylalkanes.

An object of this invention is the production of a diarylalkane.

Another object of this invention is the production of an alkylated diphenylalkane hydrocarbon.

A further object of this invention is the production of an alkylated diphenylmethane hydrocarbon.

One embodiment of this invention relates to a process for producing an unsymmetrical diarylalkane hydrocarbon which comprises reacting at hydrogen transfer conditions in the presence of an acid-acting catalyst a branched-chain olefin, an aromatic hydrocarbon having two hydrocarbon radical substituents in para positions to each other and in which at least one of these radicals has only two hydrogen atoms combined with the carbon atom that is joined to the aromatic ring, and an aromatic hydrocarbon which does not undergo hydrogen transfer when contacted alone with a branched-chain olefin in the presence of an acid-acting catalyst.

Another embodiment of this invention relates to a process for producing an unsymmetrical diarylalkane hydrocarbon which comprises reacting at hydrogen transfer conditions in the presence of an acid-acting catalyst a branched-chain olefin, an aromatic hydrocarbon having two alkyl group substituents in para positions to each other and in which one of these alkyl group substituents has at least one and not more than two hydrogen atoms combined with the carbon atom that is joined to the aromatic ring, and an aromatic hydrocarbon which does not undergo hydrogen transfer when contacted alone with a branched-chain olefin in the presence of an acid-acting catalyst.

We have developed a method for manufacturing an unsymmetrical diarylalkane hydrocarbon by effecting a reaction between a branched-chain olefinic hydrocarbon, a para-dialkylated aromatic hydrocarbon in which one alkyl group contains at least one replaceable hydrogen atom bound to the carbon atom that is combined with the aromatic ring, and an aromatic hydrocarbon which does not undergo hydrogen transfer when

2 contacted alone with a branched-chain olefin in the presence of an acid-acting catalyst.

The essential feature of this process is illustrated by the following equation which shows the reaction of paracymene, cumene and methyl cyclohexene in the presence of an alkylating catalyst to form 2-para-tolyl-2-(4-isopropylphenyl) propane and methylcyclohexane. In this reaction hydrogen transfer appears to occur between para-cymene and methylcyclohexene and the resultant unsaturated product may then be regarded as alkylating cumene to form the alkylated di(alkylphenyl)propane mentioned above.

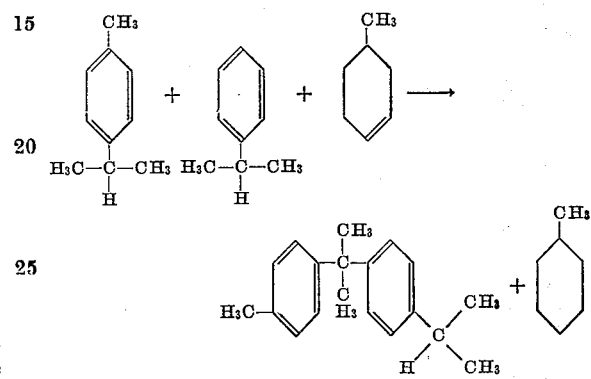

The dialkylated aromatic hydrocarbons used as one of the groups of starting materials for this process contained at least one para-arrangement of hydrocarbon radical substituents in order to give the hydrogen transfer reaction. Also one of the substituents in para-arrangement must contain either one but not more than two hydrogen atoms combined with the carbon atom that is joined to the aromatic ring. Benzene hydrocarbons suitable for the process are represented by the following formula:

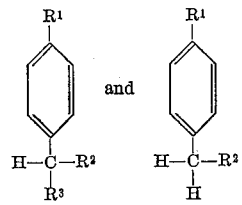

wherein each of $R^1$, $R^2$ and $R^3$ is selected from the group consisting of an alkyl radical, a cycloalkyl radical, a cycloalkalkyl radical, and a bicycloalkyl radical. By the term "cycloalkalkyl radical" is meant a hydrocarbon radical in which a cycloalkyl group replaces a hydrogen atom of an alkyl group. A cycloalkalkyl radical is thus a cycloalkyl derivative of an alkyl radical.

Such aromatic hydrocarbon starting materials include para-cymene, 1,2-di-methyl-4-isopropylbenzene, 2,4-di-isopropyltoluene, 4-iso-propyl-2-cyclohexyltoluene, and also 1-methyl-4-ethylbenzene, 1-methyl-4-normal-propylbenzene, 1,4-di-ethylbenzene, 1,4-di-normal-propylbenzene, etc. There are some other aromatic hydrocarbon starting materials for this process which do not undergo hydrogen transfer reactions with olefins in the presence of acid-acting catalysts but do undergo alkylation reactions. Such aromatic hydrocarbons include benzene and monoalkyl or monoalkylated aromatic hydrocarbons having a single hydrocarbon group bound to an aromatic ring, this single hydrocarbon group being selected from the members of the group consisting of an alkyl group, a cycloalkyl group, a cycloalkalkyl group, and a bicycloalkyl group, thus including such hydrocarbons as benzene, toluene, ethyl benzene, propyl benzene, cumene, butyl benzenes and other alkyl benzenes in which the alkyl group contains, for example, from 5 to 10 carbon atoms, etc.

Not only the above-indicated monalkylaromatic hydrocarbons are used as starting materials in this process but also polyalkyl aromatics which do not undergo a hydrogen transfer reaction when contacted alone with a branched-chain olefin in the presence of an alkylation catalyst. Such polyalkyl aromatics include polymethylbenzenes and o-diethylbenzene.

Olefinic starting materials suitable for use in this process for manufacturing diarylalkanes have branched-chains and include such hydrocarbons as trimethylethylene, dihydrolimonene, methylcyclohexene, 1,1,3 - trimethylcyclohexene, menthene, and bicycloolefins, such as camphene, etc. The exact type of olefins to be used is dependent on the catalyst and on the aromatic hydrocarbons with which the hydrogen transfer and condensation reaction is to be effected. Thus normal octene and cyclohexene which are olefins not possessing branched-chain structures, when reacted with a para-di-alkyl-aromatic hydrocarbon and another alkylatable aromatic hydrocarbon at operating conditions similar to those used with the branched-chain olefins effect alkylation rather than hydrogen transfer.

In addition to the branched-chain mono-olefins mentioned above, other olefin-acting compounds which are also utilizable in this process comprise conjugated di-olefins containing a tertiary carbon atom, alcohols, ethers, esters of carboxylic acids, and alkyl halides which may be regarded as capable of forming branched-chain olefins in situ in the reaction mixture.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acid, fluorosulfonic acids, phosphoric acids and Friedel-Crafts halide catalysts, particularly aluminum chloride, aluminum bromide, ferric chloride, zirconium chloride, and boron trifluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc. as catalysts for this reaction.

Phosphoric acid catalyst comprises orthophosphoric acid and also polyphosphoric acids such as pyrophosphoric acid, triphosphoric acid, and tetraphosphoric acid. Under certain conditions of operation various acid-acting, oxide-type catalysts may be used which include activated clays, silica-alumina composites, and other silica-containing materials which are generally utilizable as catalysts for hydrocarbon cracking.

The operating conditions used in this process are dependent upon the nature of the hydrocarbons being treated and also upon the catalysts employed. When utilizing strong mineral acids, such as hydrogen fluoride, sulfuric acid, fluorosulfonic acid, chlorosulfonic acid and the like, and also Friedel-Crafts metal halides promoted by a hydrogen halide such as hydrogen chloride, the process is carried out at temperature of from about $-30°$ to about $100°$ C. and at a pressure up to about 100 atmospheres. However, in the presence of hydrogen fluoride, sulfuric acid, and aluminum chloride catalysts the preferred operating temperature is preferably from about $0°$ to about $50°$ C. while in contact with ferric chloride catalyst the preferred operating temperature is from about $50°$ to about $100°$ C. Silica-alumina and other synthetic oxide catalysts and clays are generally used at a temperature of from about $200°$ to about $400°$ C. and at a superatmospheric pressure generally not in excess of about 100 atmospheres.

Our process is carried out in either batch or continuous type of operation. In batch-type operation the usual procedure consists in placing a mineral acid or Friedel-Crafts catalyst and a portion, generally about 50%, of the aromatic hydrocarbons in a reactor provided with a mechanically driven stirrer, cooling these materials to a temperature of from about $0°$ to about $10°$ C. and adding thereto with stirring, a solution of the branched-chain olefin in the remainder of the aromatic hydrocarbons. The reaction mixture is then separated and the product is washed, dried, and distilled to recover therefrom the diarylalkane hydrocarbons. Unconverted aromatic hydrocarbons recovered in this distillation are utilizable in the further operation of the process. It is preferred that the aromatic hydrocarbons acting as a hydrogen donor be in excess of the aromatic hydrocarbons which are submitted to alkylation.

The process is also carried out in a continuous manner by passing the aromatic and branched-chain olefinic hydrocarbons through a suitable reactor in which they are contacted in the presence of the catalyst, the latter either as a liquid or as a solid, depending upon the catalyst employed in the process. When using mineral acid catalysts such as sulfuric acid, fluorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and olefinic hydrocarbons are passed therethrough, the resultant hydrocarbon product requires no washing and drying treatment and may be distilled to separate therefrom unconverted aromatic and olefinic hydrocarbons and to recover the desired diarylalkane hydrocarbons.

Thus cymene and cumene and related alkylbenzene hydrocarbons react readily with branched-chain olefins to form a diphenylalkane and a saturated hydrocarbon, the latter having substantially the same carbon skeleton as that of the olefinic hydrocarbon charged to the process. An aromatic hydrocarbon which does not contain the aforementioned hydrocarbon radical substituents in para positions to each other does not react with a branched-chain olefin to give the desired hydrogen transfer reaction. Also an olefin which does not have a branched-chain structure such as is present in trimethylethylene, dihydrolimonene, methylcyclopentene, methylcyclohexene, etc., acts as an alkylating agent for the aromatic hydrocarbon also charged to the process. Accordingly, in order to obtain hydrogen transfer and condensation reactions rather than alkylation, it is necessary to use a branched-chain olefinic hydrocarbon together with a di-substituted benzene hydrocarbon or other di-substituted benzene hydrocarbon or other di-substituted aryl hydrocarbon in which substituents are in para positions to each other and one of said substituents comprises an ethyl group, a normal propyl group, or other hydrocarbon group in which at least one and not more than two hydrogen atoms are combined with the carbon atom adjacent to the aromatic nucleus, that is, the carbon atom in alpha position to the aromatic ring, and another aromatic hydrocarbon which does not undergo hydrogen transfer.

In applicants' related application Serial Number 788,644 (now Patent No. 2,526,897, October 26, 1950), and in parent application Serial Number 788,645 (Patent 2,526,896), which were filed November 28, 1947, and in Serial Number 36,274, filed June 30, 1948 (now Patent 2,519,577, August 22, 1950), it was disclosed that the reaction products, namely, arylindan hydrocarbons and diarylalkane hydrocarbons are useful as starting materials for the preparation of oxidation inhibitors, detergents, and additives for lubricating oils. Thus it was stated that the arylindan and diarylalkane hydrocarbons may be sulfonated and hydrolyzed to form phenols or they may be nitrated and reduced to the corresponding amines which may then be diazotized and converted into phenols that are useful as inhibitors to retard oxidation of hydrocarbons, fats, vegetable oils, foods, etc. Furthermore, these arylindan and diarylalkane hydrocarbons may also be sulfonated and the resultant sulfonation products which contain a long-chain alkyl, cycloalkyl, or cycloalkalkyl group may be converted into a surface-active agent such as a wetting agent or detergent. Also some of the indan and diarylalkane hydrocarbons formed by those processes are useful as additives in lubricating oils.

In respect to their utility, the diarylalkane hydrocarbons formed by the present process are similar to the indan and diarylalkane hydrocarbons formed by the processes of our aforementioned Patents 2,519,577, 2,526,896 and 2,526,897. Thus the unsymmetrical diarylalkanes which are formed by the present process are sulfonated and hydrolyzed to form phenols or they are nitrated and reduced to the corresponding amines which are then diazotized and converted into phenols that are useful to retard oxidation of hydrocarbons, fats, vegetable oils, foods, etc. Also the sulfonation product of an unsymmetrical diarylalkane containing a long-chain alkyl, cycloalkyl or cycloalkalkyl group is neutralized by a basic substance such as sodium hydroxide, sodium carbonate, etc., to form a surface-active agent such as a wetting agent or detergent. Some of the unsymmetrical diarylalkane hydrocarbons formed in this process are useful as additives to lubricating oils to improve the viscosity and/or cold test properties thereof.

The following example is given to illustrate this process but with no intention of limiting unduly the generally broad scope of the invention.

An agitated mixture consisting of 60 grams of hydrogen fluoride, 0.75 M. of p-ethyltoluene, and 0.15 M. of cumene is placed in a copper vessel and maintained at a temperature of 0.5° C. while a solution consisting of 0.50 M. of p-ethyltoluene, 0.10 M. of cumene and 0.20 M. of 4-methylcyclohexene is added slowly thereto. After the addition is completed the mixture is agitated for an additional time of 15 minutes and then poured upon ice, precooled to $-50°$ C. The hydrocarbon layer is washed and distilled giving about 8 grams of product corresponding to 1-p-tolyl-1-(4-isopropylphenyl)-ethane.

We claim as our invention:

1. A process for producing an unsymmetrical diarylalkane hydrocarbon which comprises reacting at hydrogen transfer conditions in the presence of an acid-acting catalyst an alkylcycloolefin, an aromatic hydrocarbon having two saturated hydrocarbon radical substituents in para positions to each other and in which one of these hydrocarbon radical substituents has at least one and not more than two hydrogen atoms combined with the carbon atom that is joined to the aromatic ring, and an aromatic hydrocarbon having not more than one saturated hydrocarbon group bound to the aromatic ring.

2. A process for producing an unsymmetrical diarylalkane hydrocarbon which comprises reacting at hydrogen transfer conditions in the presence of an acid-acting catalyst an alkylcycloolefin, an aromatic hydrocarbon having two saturated hydrocarbon radical substituents in para positions to each other and in which at least one of these hydrocarbon radical substituents has only two hydrogen atoms combined with the carbon atom that is joined to the aromatic ring, and an aromatic hydrocarbon having not more than one saturated hydrocarbon group bound to the aromatic ring.

3. A process for producing an unsymmetrical diarylalkane hydrocarbon which comprises reacting at hydrogen transfer conditions in the presence of an acid-acting catalyst an alkylcycloolefin, an aromatic hydrocarbon having two saturated hydrocarbon radical substituents in para positions to each other and in which at least one of these hydrocarbon radical substituents has only one hydrogen atom combined with the carbon atom that is joined to the aromatic ring, and an aromatic hydrocarbon having not more than one saturated hydrocarbon group bound to the aromatic ring.

4. A process for producing an unsymmetrical diarylalkane hydrocarbon which comprises reacting in the presence of a mineral acid catalyst at a temperature of from about $-30°$ to about 100° C. an alkylcycloolefin, an aromatic hydrocarbon having two alkyl group substituents in para positions to each other and in which one of these alkyl groups has at least one and not more than two hydrogen atoms combined with the carbon atom that is joined to the aromatic ring, and an aromatic hydrocarbon having not more than one saturated hydrocarbon group bound to the aromatic ring.

5. A process for producing an unsymmetrical diphenylalkane hydrocarbon which comprises reacting in the presence of a mineral acid catalyst at a temperature of from about −30° to about 100° C. an alkyl cycloolefin, a benzene hydrocarbon having two alkyl group substituents in para positions to each other and in which one of these alkyl groups has at least one and not more than two hydrogen atoms combined with the carbon atom that is joined to the benzene ring, and a benzene hydrocarbon having not more than one saturated hydrocarbon group bound to the aromatic ring.

6. A process for producing an unsymmetrical diphenylalkane hydrocarbon which comprises reacting in the presence of a sulfuric acid catalyst at a temperature of from about 0° to about 50° C. an alkylcycloolefin, a benzene hydrocarbon having two alkyl group substituents in para positions to each other and in which one of these alkyl groups has at least one and not more than two hydrogen atoms combined with the carbon atom that is joined to the benzene ring, and a benzene hydrocarbon having not more than one saturated hydrocarbon group bound to the aromatic ring.

7. A process for producing an unsymmetrical diphenylalkane hydrocarbon which comprises reacting in the presence of a hydrogen fluoride catalyst at a temperature of from about −30° to about 100° C. an alkylcycloolefin, a benzene hydrocarbon having two alkyl group substituents in para positions to each other and in which one of these alkyl groups has at least one and not more than two hydrogen atoms combined with the carbon atom that is joined to the benzene ring, and a benzene hydrocarbon having not more than one saturated hydrocarbon group bound to the aromatic ring.

8. A process for producing an unsymmetrical diarylalkane hydrocarbon which comprises reacting in the presence of a mineral acid catalyst at a temperature of from about −30° to about 100° C. an alkylcycloolefin, a monoalkylated aromatic hydrocarbon, and an aromatic hydrocarbon having two alkyl group substituents in para positions to each other and in which one of these alkyl groups has at least one and not more than two hydrogen atoms combined with the carbon atom that is joined to the aromatic ring.

9. A process for producing an unsymmetrical diphenylalkane hydrocarbon which comprises reacting in the presence of a hydrogen fluoride catalyst at a temperature of from about −30° to about 100° C. an alkylcycloolefin, a monoalkylbenzene hydrocarbon and a benzene hydrocarbon having two alkyl group substituents in para positions to each other and in which one of these alkyl groups has at least one and not more than two hydrogen atoms combined with the carbon atom that is joined to the benzene ring.

10. A process for producing 2-para-tolyl-2-(5-isopropylphenyl)propane which comprises reacting cymene, cumene, and a branched-chain olefin in the presence of a mineral acid catalyst at a temperature of from about −30° to about 100° C.

11. A process for producing 2-para-tolyl-2-(5-isopropylphenyl)propane which comprises reacting cymene, cumene, and a branched-chain olefin in the presence of a hydrogen fluoride catalyst at a temperature of from about −30° to about 100° C.

12. A process for producing 2-para-tolyl-2-(5-isopropylphenyl)propane which comprises reacting cymene, cumene, and a branched-chain olefin in the presence of a hydrogen fluoride catalyst at a temperature of from about 0° to about 50° C.

13. A process for producing 2-para-tolyl-2-(5-isopropylphenyl)propane which comprises reacting cymene, cumene, and a branched-chain olefin in the presence of a sulfuric acid catalyst at a temperature of from about 0° to about 50° C.

14. A process for producing an unsymmetrical diarylalkane hydrocarbon which comprises reacting at hydrogen transfer conditions in the presence of an acid-acting catalyst a branched-chain cyclohexene hydrocarbon, an aromatic hydrocarbon having two saturated hydrocarbon radical substituents in para positions to each other and in which one of these hydrocarbon radical substituents has at least one end not more than two hydrogen atoms combined with the carbon atom that is joined to the aromatic ring, and an aromatic hydrocarbon having not more than one saturated hydrocarbon group bound to the aromatic ring.

15. A process for producing a diarylalkane which comprises reacting para-cymene, cumene and a branched-chain olefin at hydrogen transfer conditions and in the presence of an acid-acting catalyst.

16. A process for producing a diarylalkane which comprises reacting para-cymene, cumene and methylcyclohexene at hydrogen transfer conditions and in the presence of an acid-acting catalyst.

HERMAN PINES.
VLADIMIR N. IPATIEFF.

References Cited in the file of this patent

UNITED STATES PATENTS

| Number | Name | Date |
|---|---|---|
| 2,010,949 | Egloff | Aug. 13, 1935 |

OTHER REFERENCES

Ipatieff et al., "Influence of Sulfuric Acid Concentration . . .," Jour. Amer. Chem. Soc., 58, pages 919–922 (June 1936) 4 pages.

Simons, "Potential Use of Hydrogen Fluoride . . .," Ind. Eng. Chem. 32, pages 178–183 (6 pages), February 1940.

Scahanen, "Conversion of Petroleum," page 373 (1 page), published by Reinhold Pub. Corp., New York (1940).

Thomas, "Anhydrous Aluminum Chloride in Organic Chemistry," page 430 (1 page only), published by Reinhold Pub. Corp., New York (1941).